US008647483B2

(12) United States Patent
Andrews et al.

(10) Patent No.: US 8,647,483 B2
(45) Date of Patent: Feb. 11, 2014

(54) CHLORINATORS AND OTHER FLUID RECEIVING DEVICES

(75) Inventors: Craig Andrews, Kirribilli (AU); Raymond A. Hin, Kilsyth (AU)

(73) Assignee: Zodiac Pool Systems, Inc., Vista, CA (US)

( * ) Notice: Subject to any disclaimer, the term of this patent is extended or adjusted under 35 U.S.C. 154(b) by 253 days.

(21) Appl. No.: 13/185,707

(22) Filed: Jul. 19, 2011

(65) Prior Publication Data

US 2012/0012209 A1 Jan. 19, 2012

Related U.S. Application Data

(60) Provisional application No. 61/399,884, filed on Jul. 19, 2010.

(51) Int. Cl.
*C25B 15/08* (2006.01)
*C02F 1/467* (2006.01)
*C25B 1/26* (2006.01)

(52) U.S. Cl.
USPC ............... 204/275.1; 210/434; 210/748.2; 137/599.15

(58) Field of Classification Search
USPC ......... 285/310; 210/434; 137/599.11, 599.12, 137/599.14, 599.15
See application file for complete search history.

(56) References Cited

U.S. PATENT DOCUMENTS

| 846,100 | A | * | 3/1907 | Estep | 137/599.14 |
|---|---|---|---|---|---|
| 1,101,574 | A | * | 6/1914 | Shephard | 137/573 |
| 1,987,847 | A | * | 1/1935 | Flood | 210/167.32 |
| 2,240,648 | A | * | 5/1941 | Hartman | 137/592 |
| 3,292,954 | A | * | 12/1966 | Corey | 285/198 |
| 3,682,308 | A | * | 8/1972 | Moon | 210/136 |
| 5,855,777 | A | | 1/1999 | Bachand et al. | |
| 6,680,026 | B1 | | 1/2004 | Denkewicz et al. | |
| 6,966,328 | B2 | * | 11/2005 | Benham | 137/101.11 |
| 7,736,500 | B2 | * | 6/2010 | Rivi | 210/190 |
| 2006/0169647 | A1 | * | 8/2006 | Doyle et al. | 210/739 |
| 2006/0266682 | A1 | | 11/2006 | Kennedy et al. | |

FOREIGN PATENT DOCUMENTS

| WO | WO03006380 | 1/2003 |
|---|---|---|
| WO | WO2006/110799 | 10/2006 |

OTHER PUBLICATIONS

International Search Report and Written Opinion dated Jan. 12, 2012 in related Application No. PCT/US2011/044445.
Communication Relating to the Results of the Partial International Search dated Nov. 10, 2011 in related Application No. PCT/US2011/044445.
International Preliminary Report on Patentability dated Jan. 31, 2013 in related Application No. PCT/US2011/044445.

* cited by examiner

*Primary Examiner* — Harry D Wilkins, III
(74) *Attorney, Agent, or Firm* — Dean W. Russell; Kilpatrick Townsend & Stockton LLP (57) ABSTRACT

Devices for receiving fluid such as water are described. Principally (although not necessarily exclusively) designed for use as chlorinators, the devices may divert water flowing in conduits into the devices for treatment and subsequent return to the flow stream. A device may connect to a pipe without tools and require only one hole to be formed in a pipe wall.

14 Claims, 8 Drawing Sheets

CHLORINATORS AND OTHER FLUID RECEIVING DEVICES

CROSS REFERENCE TO RELATED APPLICATION

This application claims the benefit of U.S. Provisional Patent Application Ser. No. 61/399,884 entitled "Chlorinators and Other Fluid Receiving Devices" filed on Jul. 19, 2010, the contents of which are incorporated herein by reference.

FIELD OF THE INVENTION

This invention relates to fluid receiving devices and more particularly, although not necessarily exclusively, to chlorinators or other treatment devices for circulating water used in swimming pools, spas, hot tubs, or other water-containing vessels.

BACKGROUND OF THE INVENTION

U.S. Pat. No. 6,680,026 to Denkewicz, et al., discloses water-purification equipment useful especially in connection with swimming pools, spas, and hot tubs, where water recirculates. The equipment may provide "plug-in" forms of fluid-flow diverters "designed to penetrate, or fill, openings intermediate remote ends of conduits." See Denkewitz, col. 2, ll. 3-4. As indicated in the Denkewicz patent:

> Embodiments of the invention contemplate diverting flowing fluid to purification equipment formed about or otherwise connected to such diverters, permitting diverted water to be purified before rejoining the flow. The . . . circulating nature of the water permits more of its volume ultimately to be diverted into the equipment for purification.

See id., ll. 13-15.

Positioned within the equipment of the Denkewicz patent is water purification media such as "mineral-based pellets or other objects of silver-, zinc-, or copper-containing material." However, other media alternatively may be used therein. According to the Denkewicz patent, "[c]hlorine or other chemicals which may be dissolved or contacted by the water being diverted are among suitable alternatives." See id., ll. 57-59.

International (Patent) Publication No. WO 2006/110799 of Kennnedy, et al. [sic Kennedy, et al.] details additional equipment used to divert flowing fluid for purification. Diverted fluid may be treated by, for example, a salt water chlorinator (SWC) having an electrolytic cell. Treated water is then returned to the main flow stream via a series of fins, with the overall configuration of the equipment being designed to, among other things, cause the bulk of fluid experiencing pressure spikes to remain in the conduit. See, e.g., Kennedy, p. 12, ll. 4-10. Accordingly, housings detailed in the Kennedy publication may be "fabricated from less pressure-resistant materials, and need not be engineered in the same way as other pressure vessels." See id., ll. 13-14. The contents of the Denkewicz patent and the Kennedy publication are hereby incorporated herein in their entireties by this reference.

SUMMARY OF THE INVENTION

The present invention provides additional equipment in the style of the diverters of the Denkewicz patent and the Kennedy publication. Devices of the invention may divert water flowing in conduits into the devices for treatment and subsequent return to the flow stream. Inlet and return tubes may be utilized within the conduits, with the openings of the tubes preferably (but not necessarily) angled relative to central longitudinal axes of the conduits. The openings additionally may (but again need not necessarily) open in the same plane.

An optional third tube, beneficially in the form of a feeder port or gas extraction tube, also may be present in devices of the invention. If desired, the opening of the third tube too may be in the same plane as the openings of the inlet and return tubes. Moreover, the inlet tube may include a deflector and be formed generally as a "scoop." Combined, the configurations of (at least) the inlet and return tubes tend to create vortex action evacuating fluid from the return tube back into the conduit. Additional tubes may be employed as part of devices of the invention.

Unlike certain other devices, in which the inlet and return tubes are intentionally spaced longitudinally within a conduit, devices of the present seek to omit that spacing. Accordingly, inlet and return tubes (and any optional third tube) may share walls or other boundaries. As a consequence, only one opening need be drilled or otherwise created in a wall of a conduit to accommodate entry of all of the tubes.

A device of the present invention further may be retained in position about a conduit using a single knob, nut, or similar fastener. This single fastener may engage a lower portion of a housing of the device and move a plate upward, with the upward movement of the plate inducing the conduit to bear against a rubber or similar seal associated with an upper portion of the housing. This structure as well permits the device to accommodate conduit of differing sizes or diameters. One or more straps or other fasteners (including use of multiple fasteners) could be employed instead.

A presently-preferred embodiment of the invention incorporates a salt-water chlorinator (SWC) within the upper portion of the housing. Fluid, most typically water, flowing within a conduit is diverted from the conduit into the device via the inlet tube. Thereafter the diverted water passes through the SWC for treatment and then is returned to the conduit via the return tube. Because electrodes of an SWC are consumed in use, the consumable portions of the SWC within the upper portion of the housing may be removable therefrom for disposal and replacement. Hence, devices of the present invention may include removable caps on the housings to allow access to the to-be-removed portions of the SWCs.

Versions of the invention may utilize features as described above yet need not necessarily chlorinate or otherwise treat fluid. Some versions, for example, may include sensors adapted to sense various characteristics of fluid flowing diverted from a conduit into the housing. These versions may, if appropriate, include a baffle or otherwise be configured to create one or more low-flow regions within the housings. Different versions may divert fluid from the conduit to a separate device.

Other embodiments of the invention may include controllers connected directly to housings. Such direct connection may be both mechanical and electrical, moreover. Particularly when electrically-powered equipment (such as SWCs) are included in the devices, directly connecting a controller to a housing may, for example, avoid electrical cabling that otherwise would be required.

It thus is an optional, non-exclusive object of the present invention to provide innovative fluid receiving devices.

It is, moreover, an optional, non-exclusive object of the present invention to provide "plug-in" types of equipment particularly useful for treating or otherwise receiving circulating water.

It is a further optional, non-exclusive object of the present invention to provide fluid receiving devices in which inlet and return tubes create vortex action to evacuate fluid from the devices and into conduits.

It is also an optional, non-exclusive object of the present invention to provide fluid receiving devices in which a single fastener may be employed to clamp devices about conduits of varying sizes.

It is another optional, non-exclusive object of the present invention to provide fluid receiving devices to which sensors, controllers, or other equipment may be connected directly or indirectly.

Other objects, features, and advantages of the present invention will be apparent to those skilled in the relevant fields with reference to the remaining text and the drawings of this application.

DETAILED DESCRIPTION

Figure 1:
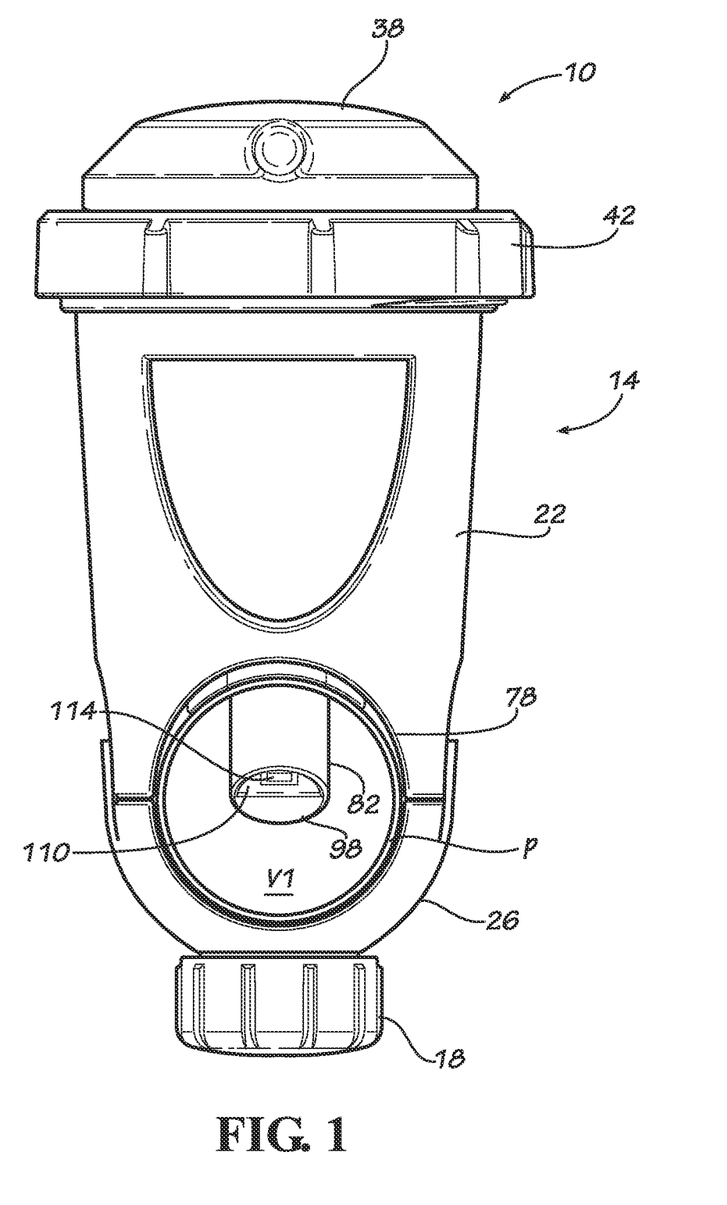
FIG. 1 is an elevational view of an exemplary device of the present invention.
Figure 2:
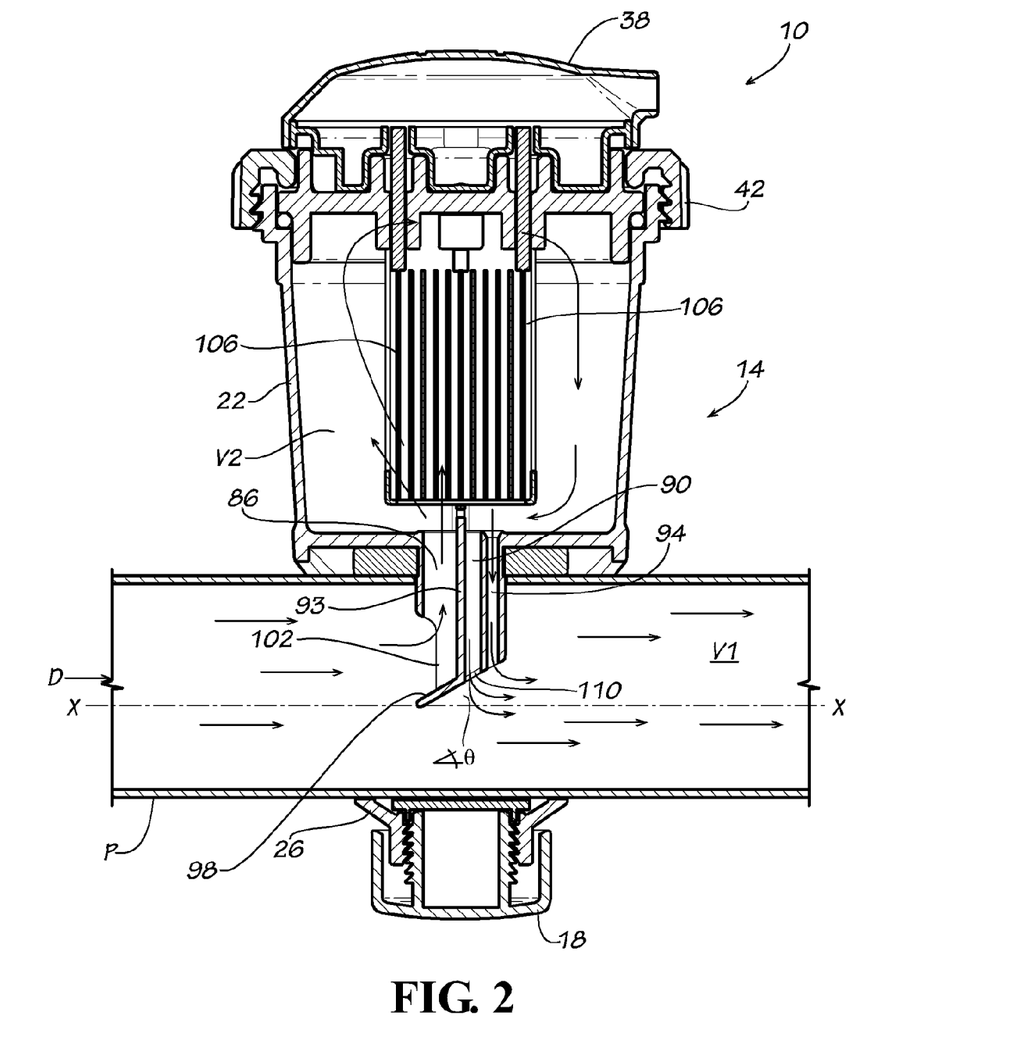
FIG. 2 is a cross-sectional view of the device of FIG. 1 shown attached to a conduit.
Figure 3:
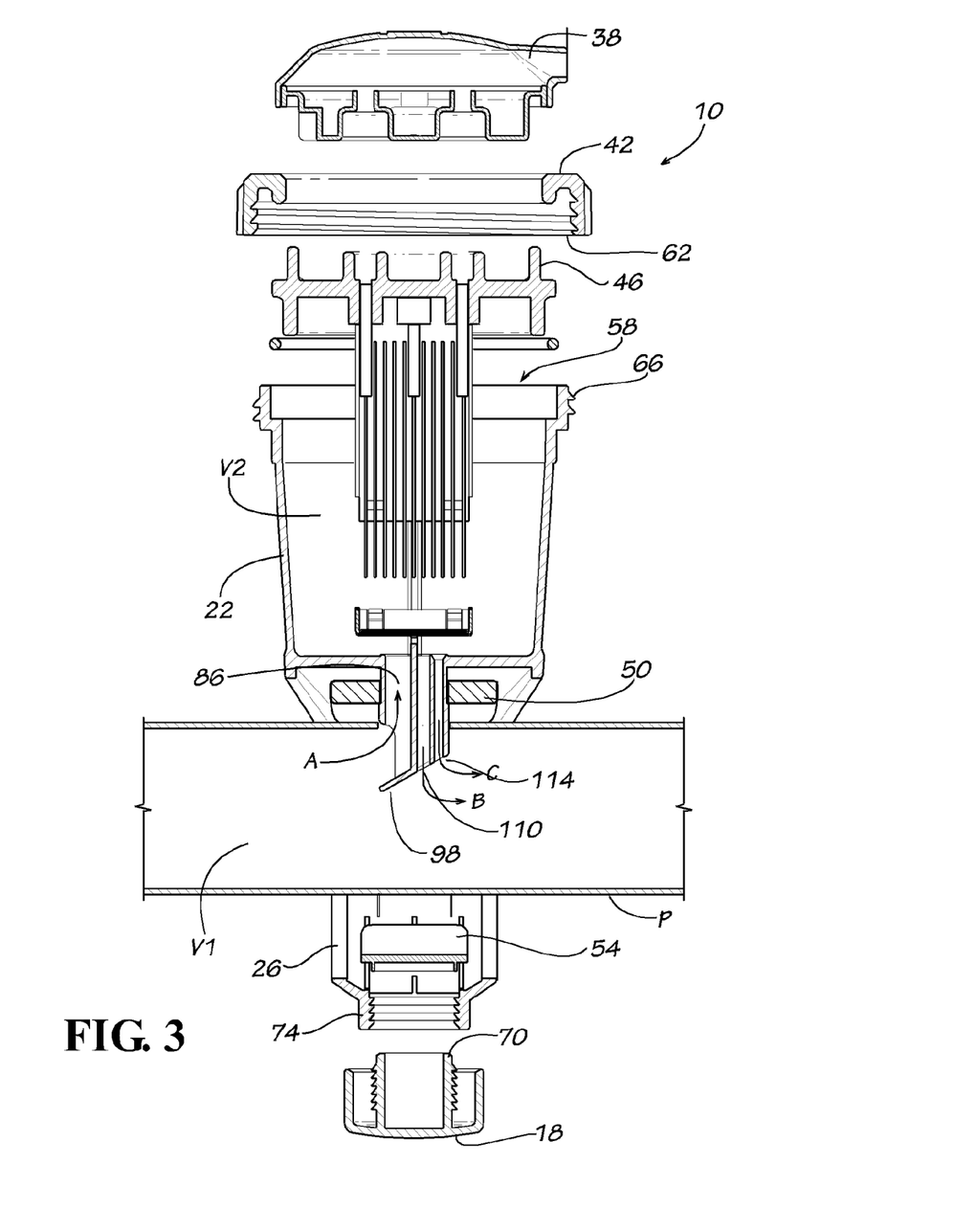
FIG. 3 is an exploded cross-sectional view of the device of FIGS. 1-2.

Illustrated in FIGS. 1-3 is exemplary device 10 of the present invention. Device 10 advantageously may include housing 14 and knob or nut 18. Housing 14 may comprise at least upper portion 22 and lower portion 26, which are preferably connected about pipe or conduit P when device 10 is in use. As shown in, e.g., FIG. 4B, lower portion 26 may include one or more prongs 30 configured to snap-fit into, or otherwise engage, corresponding recesses 34 of upper portion 22.

Also comprising device 10 may be any or all of cap 38, collar 42, electrode housing 46, seal 50, and push plate 54. Cap 38 is configured to connect to either or both of collar 42 or upper portion 22. Cap 38 also preferably is removable from at least upper portion 22 so as to allow access therein. Beneficially, cap 38 is positioned over opening 58 of upper portion 22 and locked into place using threaded collar 42, whose threads 62 engage corresponding threads 66 of the upper portion 22.

Interconnecting with either or both of cap 38 and collar 42 may be electrode housing 46. Electrode housing 46, which may be part of an SWC, preferably is positionable within—but removable from—upper portion 22. Removability of electrode housing 46 is especially important when its electrodes are consumed in use, as replacement of the electrodes eventually will be required in such circumstances in order for device 10 to remain functional. Similarly, if device 10 includes consumable chemical media (e.g. solid chlorine, solid bromine, erodable metals, etc.) within upper portion 22, replacement of the media may need to occur.

Seal 50, push plate 54, and nut 18 facilitate clamping of conduit P between upper portion 22 and lower portion 26 of housing 14. As illustrated particularly in FIGS. 2-3, when device 10 is upright, seal 50 may be positioned between upper portion 22 and an upper part of the wall of conduit P. By contrast, push plate 54 may be positioned within lower portion 26 adjacent a lower part of the wall of the conduit P. Prongs 30 then may be fitted into recesses 34 to connect upper and lower portions 22 and 26.

Nut 18, which may be threaded, also includes central protrusion 70. As nut 18 is inserted into corresponding threads 74 of lower portion 26 and then rotated, central protrusion 70 moves upward, forcing push plate 54 to bear against conduit P. This bearing in turn causes conduit P to bear against seal 50. The result is the clamping of conduit P firmly within device 10—with such clamping requiring only one fastener (e.g. nut 18) and not requiring any tools. Moreover, because electrode housing 46 may be accessed from above by removing cap 38, electrode housing 46 may be removed and replaced as desired without any need to unclamp device 10 from conduit P.

Upper portion 22 may include a generally saddle-shaped floor 78. Protruding downward therefrom may be tube structure 82. When device 10 is in use, structure 82 is fitted into conduit P. In the version of device 10 depicted in FIGS. 1-3, because tube structure 82 is unitary, only one hole need be created in a wall of conduit P to allow insertion of the structure 82 into the interior volume V1 of the conduit P. By creating only one hole in conduit P, the risk of fluid leakage from the conduit P is reduced.

Incorporated into tube structure 82 are at least inlet tube 86 and return tube 90. As shown especially in FIGS. 2-3, these separate tubes 86 and 90 nevertheless may share a boundary (e.g. wall 93). Such boundary sharing reduces the diameter of structure 82, allowing the hole necessarily created in conduit P to be smaller. Sharing of boundaries is not mandatory, however, as tubes 86 and 90 may be configured in any appropriate manner.

Also illustrated in FIGS. 1-3 is optional third tube 94, beneficially in the form of a feeder port or gas extraction tube. Although referred to herein as "tubes," none of structure 82, inlet tube 86, return tube 90, or third tube 94 need be "tubular" in any strict sense. Stated differently, "tubes" as used in this application need not refer solely to cylindrical objects or items with curved walls. Rather, they may encompass any bounded region allowing fluid flow consistent with the objectives of the invention.

In at least one version of device 10, inlet tube 86 includes deflector 98 at its entrance 102. Deflector 98 facilitates inlet tube 86 acting as a "scoop" to divert fluid from conduit P into interior volume V2 of upper housing 22. Likewise, in at least one version of device 10 including third tube 94, the third tube 94 and return tube 90, while separate, nonetheless share a boundary. When device 10 is in use, (some) fluid flowing in direction D encounters inlet tube 86 and is diverted (in the direction of arrow A) into volume V2. Within volume V2, the fluid contacts electrodes or plates 106 of electrode housing 46; thereafter, it flows in the direction of arrow B to return to conduit P via return tube 90. In this version of device 10, third tube 94 may be used to extract gas that otherwise might accumulate within volume V2. Any such gas may flow in the direction of arrow C from volume V2 into conduit P.

Shown particularly in FIGS. 2-3 is that deflector 98 and entrance 110 of return tube 90 (as well as entrance 114 of optional third tube 94) may be planar, with the plane being angled relative to a longitudinal axis X of conduit P. Applicants believe this configuration of tube structure 82 creates vortex action within conduit P and facilitates operation of the Venturi principle to enhance fluid capture via inlet tube 86 and fluid evacuation via return tube 90. Identified in FIG. 2 is an angle θ depicting the angling relative to axis X. Presently preferred is that angle θ range within 10-80°, most preferably between 30-60°. Notwithstanding these present preferences, however, angle θ may, in some embodiments, range from 0-90°. Moreover, depending on the design of tube structure 82, angle θ conceivably could be greater than 90° or less than 0°.

Figures 4A, 4B:
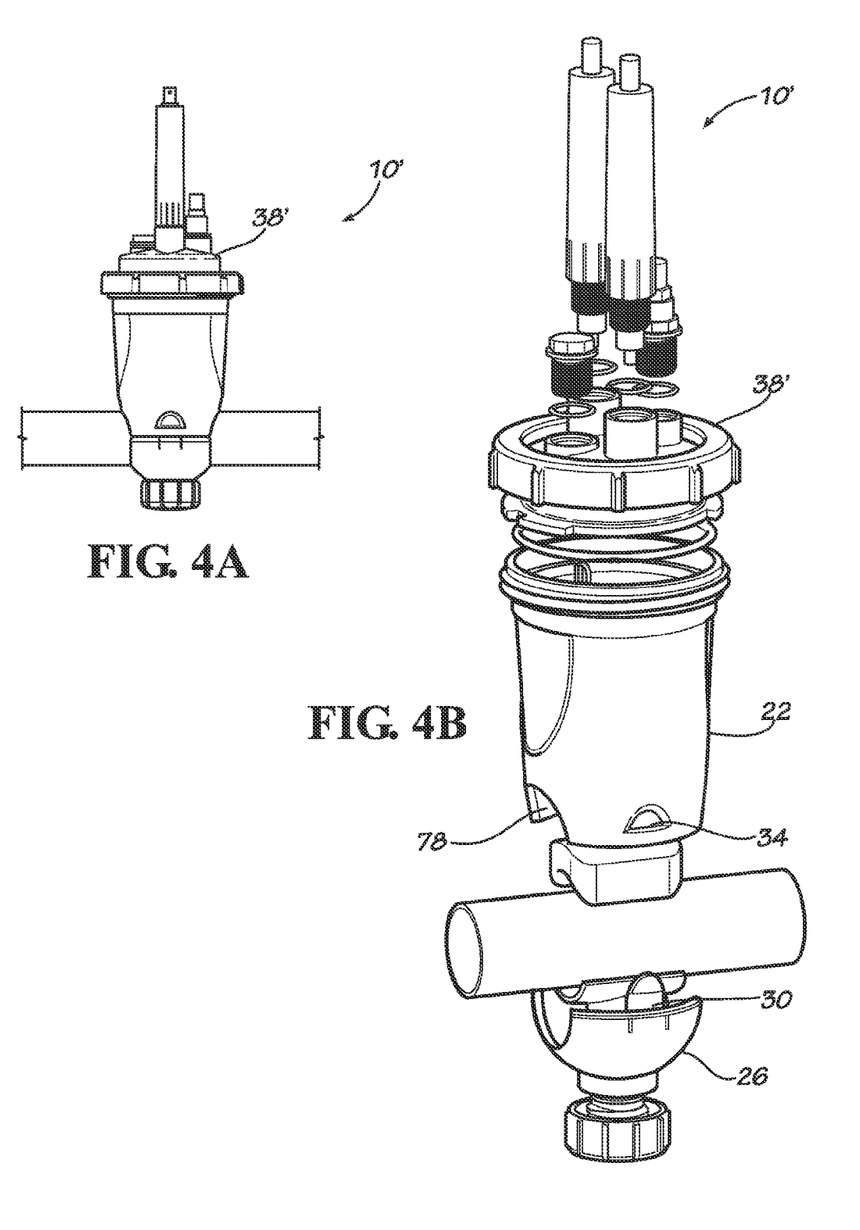
FIGS. 4A-C are views of a first alternate device of the present invention.
Figure 4C:
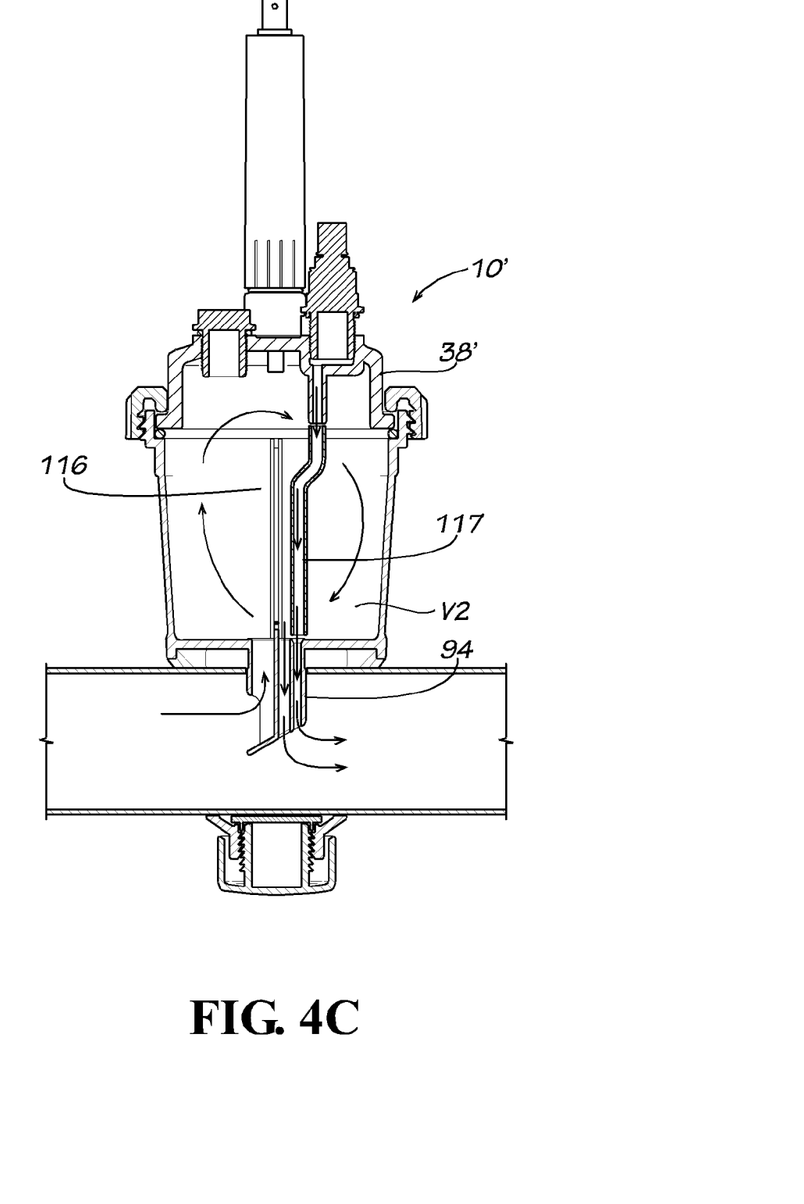

FIGS. 4A-C depict alternate device 10' of the present invention. Device 10' may include any or all of housing 14 (including upper portion 22 and lower portion 26), nut 18, collar 42, seal 50, and push plate 54. Device 10' additionally may include cap 38', similar in some respects but not identical to cap 38. Rather than (or in addition to) including electrode housing 46, however, device 10' may include one or more sensors within volume V2 as well as, for example, optional internal baffle 116. Moreover, in the version of device 10' shown in FIGS. 4A-C, third tube 94 may connect to an acid supply via internal tube 117 and function as a feeder port to dispense acid into fluid flowing in conduit P. Alternatively, device 10' may be configured to perform any of the treating, sensing, or other tasks discussed in U.S. Patent Application Publication No. 2010/0032355 of Andrews, et al. or U.S. patent application Ser. No. 12/797,701 of Hin, et al., and the contents of these two applications are hereby incorporated herein in their entireties by this reference.

FIGS. 5A-B and 6A-D, finally, illustrate device 10" of the invention. Device 10" may be generally similar to device 10 and, for example, contain electrode housing 46 within volume V2. Alternatively, device 10" may contain alternative or additional electrical or electronic devices.

Depicted atop or adjacent device 10" in FIGS. 5A-B and 6A-D are various exemplary controllers 118. In each drawing, a controller 118 is shown as connected to device 10" without using any exterior or stand-alone cabling. Instead, modular or other jacks and plug arrangements may be employed to connect a controller 118 to electrode housing 46 (or other electrical or electronic device). In at least one embodiment of device 10", cap 38" may be modified so that electrodes of an SWC contained within volume V2 may be accessed without removing the cap 38". When controller 118 is mechanically attached to device 10"—which may occur in any suitable manner—the controller 118 also connects electrically. Preferably, controller 118 is removable from (or with) cap 38" so as to allow access within volume V2 when needed.

Figure 5A:
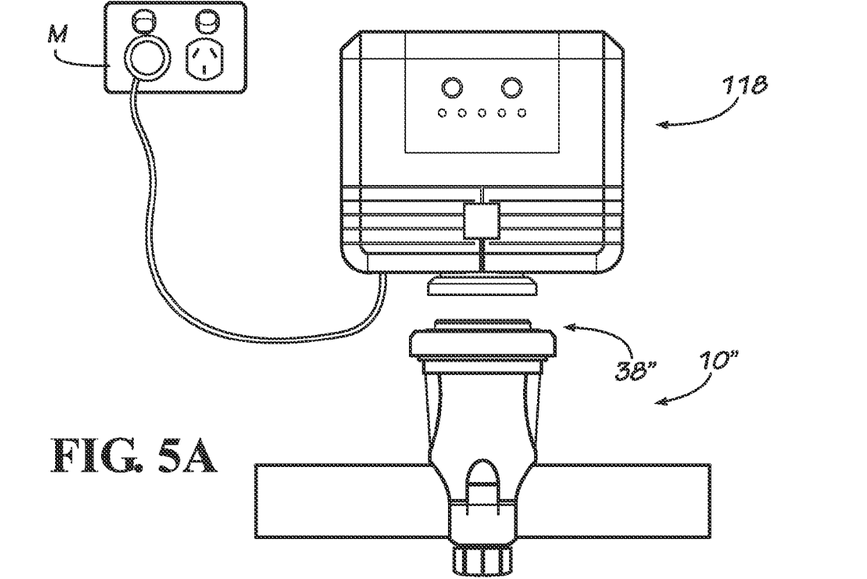
FIGS. 5A-B are views of a second alternate device of the present invention to which a controller is connected.
Figure 5B:
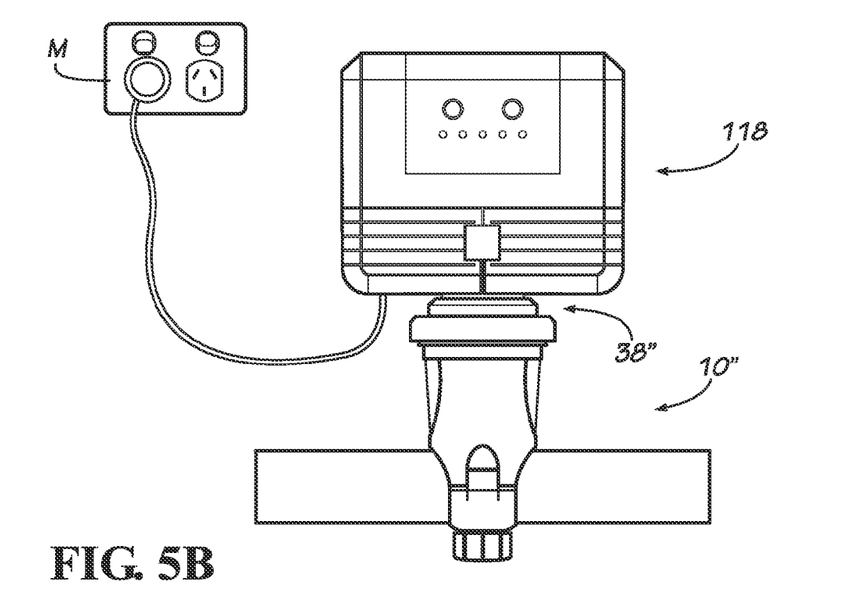
Figure 6A:
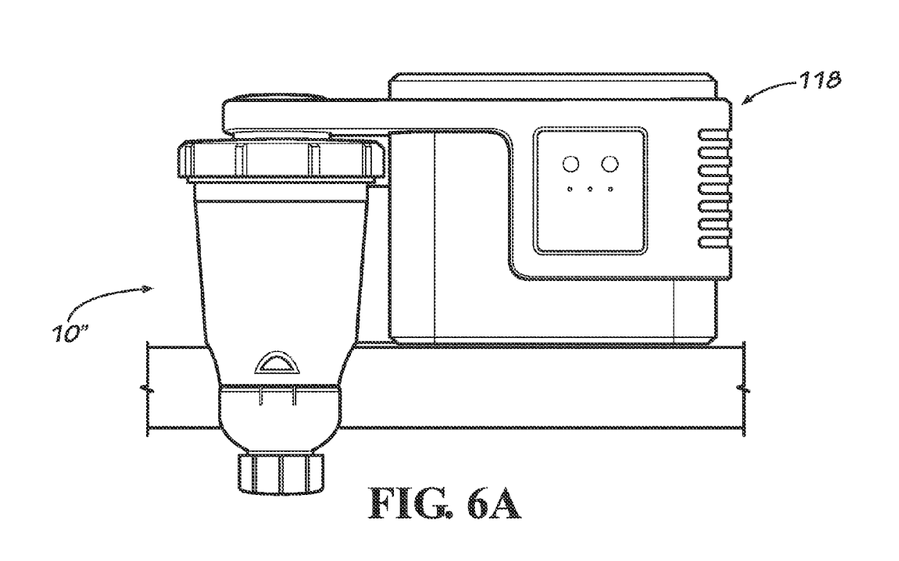
FIGS. 6A-D are views of the device of FIGS. 5A-B to which different controllers are connected.
Figure 6B:
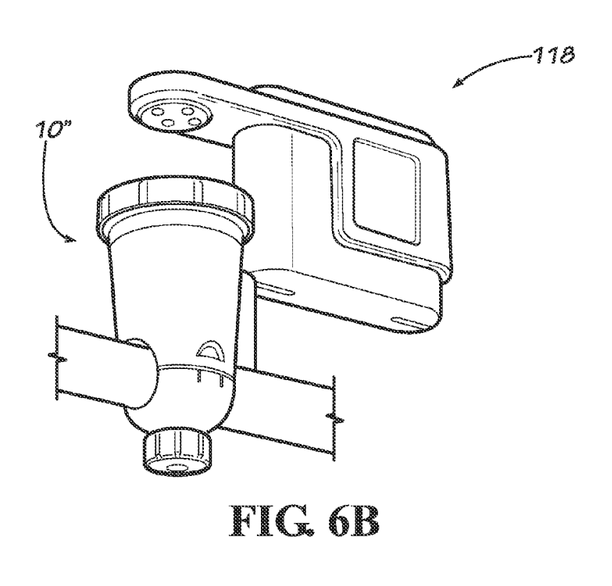
Figure 6C:
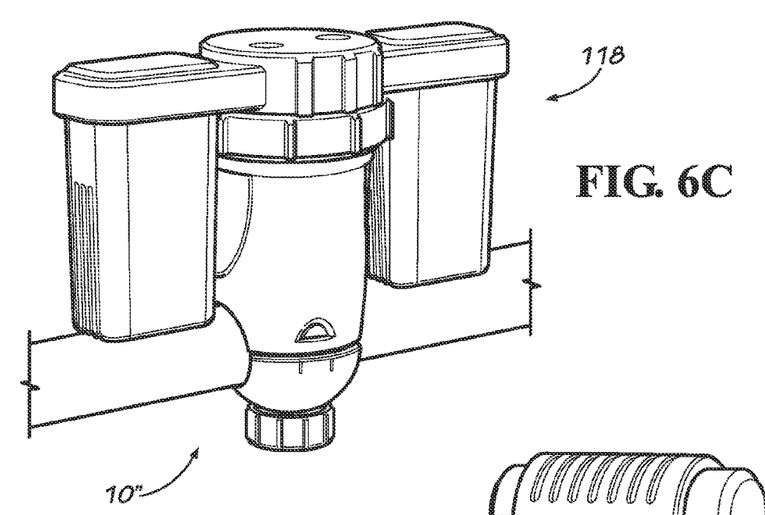
Figure 6D:
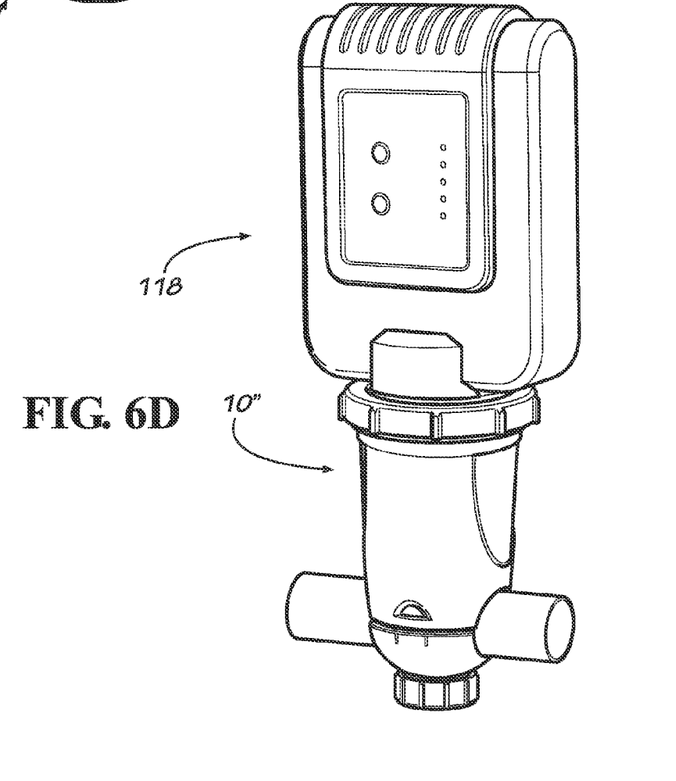

Controller 118 may itself contain a computer or, instead, be as simple as a power supply. It may receive power in any suitable way. As shown in FIGS. 5A-5B, power to controller 118 may be provided by electrical mains M. Alternatively, other power sources (including, but not limited to, solar power) may be used.

Directional terms (including but not limited to "upper," "lower," "above," etc.) are used as though devices 10, 10', and 10" are upright. The devices may be installed other than in an upright manner, however. Consequently, none of the directional terms is necessarily used herein in any absolute sense. Indeed, the foregoing is provided for purposes of illustrating, explaining, and describing embodiments of the present invention. Modifications and adaptations to these embodiments will be apparent to those skilled in the art and may be made without departing from the scope or spirit of the invention.

We claim:

1. A device for diverting fluid from a conduit having a longitudinal axis and returning at least some of the diverted fluid to the conduit, comprising:
   a. a housing; and
   b. a tube structure comprising:
      i. an inlet tube having an entrance and including a deflector; and
      ii. a return tube having an entrance; and
   in which the deflector and the entrance of the return tube are co-planar within the conduit.

2. A device according to claim 1 in which the deflector and the entrance of the return tube are angled relative to the longitudinal axis of the conduit.

3. A device according to claim 2 in which the angle of the entrance of the return tube relative to the longitudinal axis of the conduit is 10-80°.

4. A device according to claim 2 in which the inlet tube and the return tube share a boundary.

5. A device according to claim 1 in which the angle of the deflector relative to the longitudinal axis of the conduit is between 10-80°.

6. A device according to claim 1 in which the inlet tube and the return tube share a boundary.

7. A device according to claim 1 in which the tube structure further comprises a third tube having an entrance.

8. A device according to claim 7 in which the entrance of the third tube is co-planar with the deflector and the entrance of the return tube within the conduit.

9. A device for diverting fluid from a conduit and returning at least some of the diverted fluid to the conduit, comprising:
   a. a housing; and
   b. a tube structure comprising:
      i. an inlet tube having an entrance and including a deflector; and
      ii. a return tube having an entrance; and
   in which the deflector and the entrance of the return tube are co-planar within the conduit and the tube structure is configured to create vortex action in use within the conduit.

10. A device according to claim 9 in which the tube structure further comprises a third tube having an entrance.

11. A device according to claim 10 in which the entrance of the third tube is co-planar with the deflector and the entrance of the return tube within the conduit.

12. A device for diverting fluid from a conduit and returning at least some of the diverted fluid to the conduit, comprising:
   a. a housing having an internal volume;
   b. a tube structure comprising:
      i. an inlet tube having an entrance; and
      ii. a return tube having an entrance;
   c. an electrical apparatus positioned at least partially within the internal volume; and
   d. a controller mechanically removably connected to the housing externally of the internal volume and configured to connect electrically to the electrical apparatus.

13. A device according to claim 12 in which the electrical device is a salt-water chlorinator.

14. A device according to claim 12 in which the electrical connection of the controller and electrical apparatus occurs without using external cabling.

\* \* \* \* \*